May 29, 1928.
J. LEDWINKA
1,671,829
MUFFLER FOR INTERNAL COMBUSTION ENGINES
Filed March 7, 1921   3 Sheets-Sheet 1
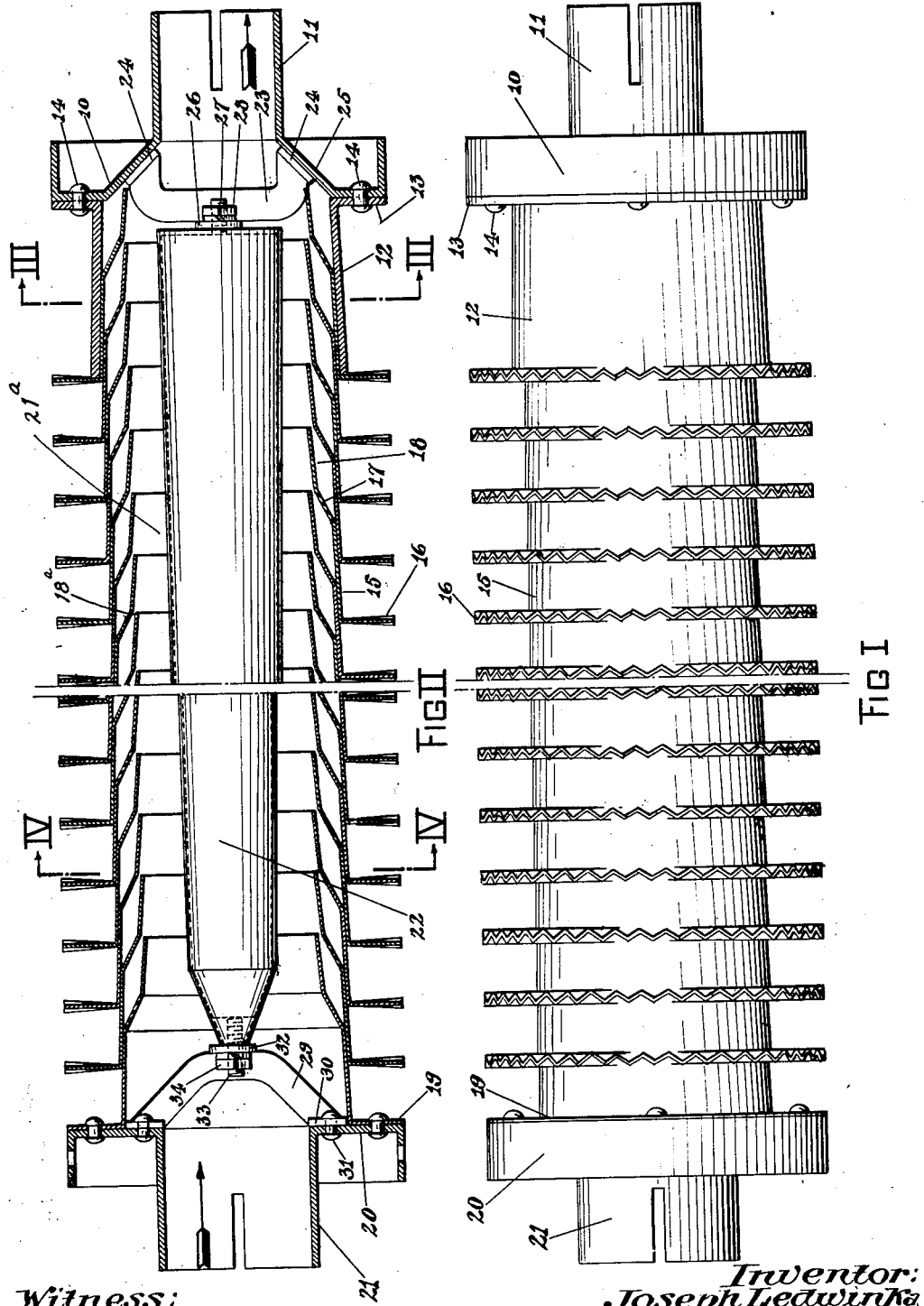

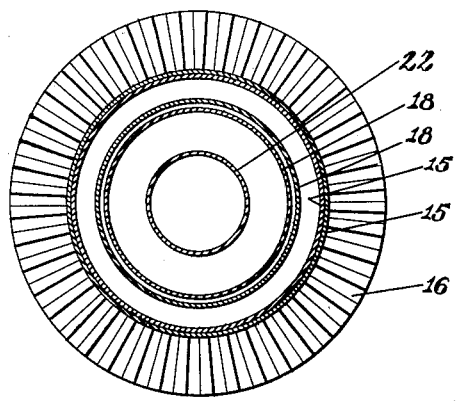
Fig IV
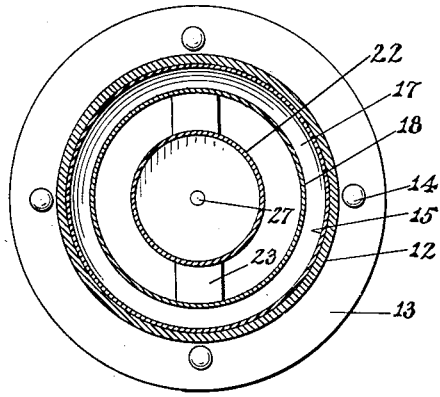
Fig III
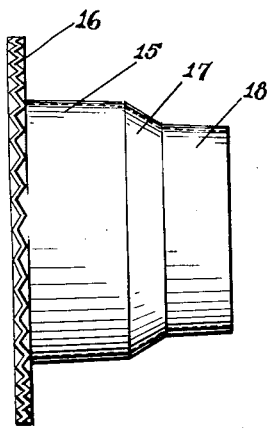
Fig V
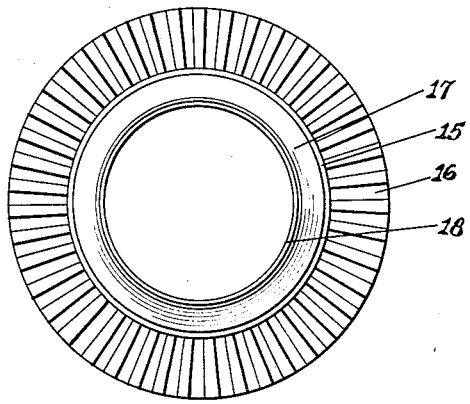
Fig VI

May 29, 1928.
J. LEDWINKA
1,671,829
MUFFLER FOR INTERNAL COMBUSTION ENGINES
Filed March 7, 1921   3 Sheets-Sheet 3
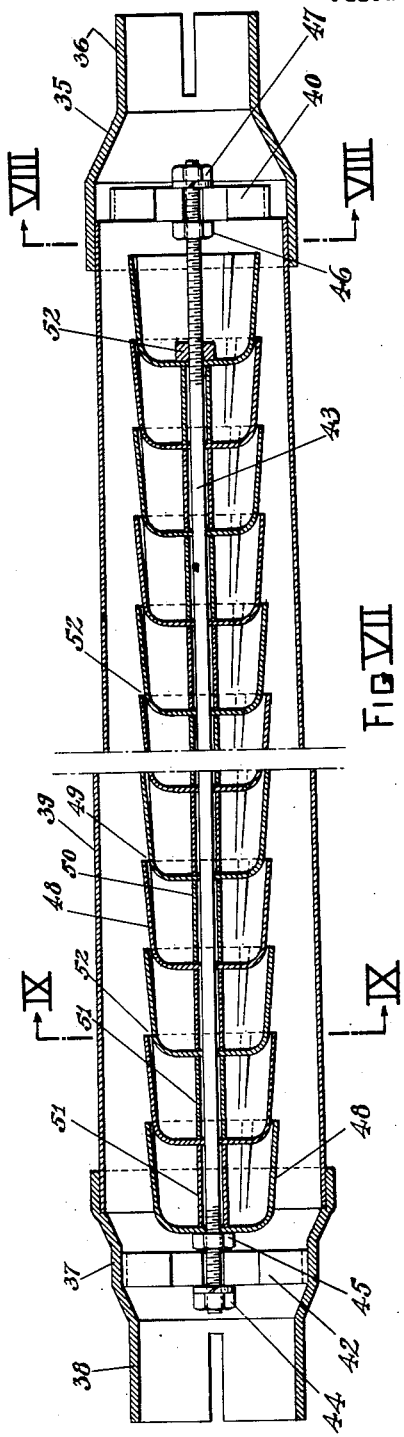
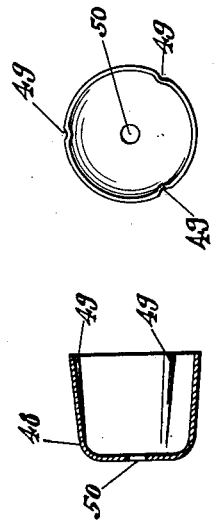
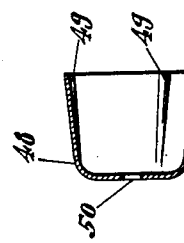
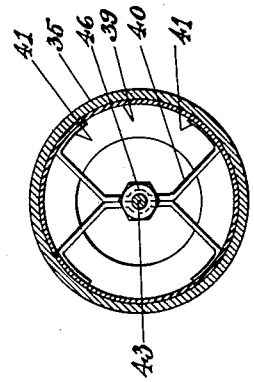
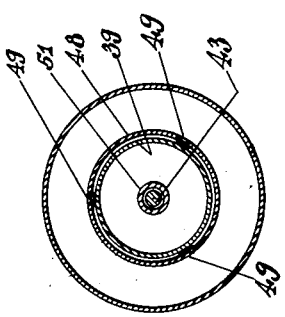
Witness:
R. H. Schleicher
Inventor:
Joseph Ledwinka,
By C. B. Des Jardins
Attorney Patented May 29, 1928.

1,671,829

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA.

MUFFLER FOR INTERNAL-COMBUSTION ENGINES.

Application filed March 7, 1921. Serial No. 450,395.

My invention relates to improvements in mufflers for internal combustion engines.

One object of my invention is to provide a muffler for use in connection with internal combustion engines which is simple in structure, efficient in operation, light in weight, and economical to manufacture.

Another object is to provide a muffler of the character referred to which can be easily and quickly taken apart for cleaning, renewal of parts or repair, and assembled again for use.

A further object is to provide a device of the nature referred to which muffles or silences the noise of the exhaust from the engine.

A further object is to provide a muffler structure which is effective in cooling the exhaust gases, and wherein back pressure is reduced.

A further object is to provide a structure of the nature referred to wherein the flow of the exhaust gases is utilized to create a retarding action upon such flow thereby breaking up the successive pulsations under which the gases are delivered or expelled from the engine, and enabling the same to become cooled and reduced in volume before reaching the atmosphere.

Another object of the invention is to provide a muffler construction for internal combustion engines, having a free unobstructed passage for the exhaust flow of the gases, and with which passage communicate chambers in each of which is created a vacuum by the flow of the exhaust gases through said passage to impose a retarding and equalizing action on the flow and pulsations of the exhaust gases.

Other objects of the invention will appear more fully hereinafter.

The invention consists substantially in the construction, combination, location and arrangement of parts all as will be more fully hereinafter set forth, as shown in the accompanying drawings, and finally pointed out in the appended claims.

Referring to the accompanying drawings:—

Fig. I is a view in elevation of one form of muffler constructed in accordance with my invention, the central part of the muffler being broken away.

Fig. II is a view in central, longitudinal section through the muffler illustrated in Fig. I, the core of the muffler being shown in elevation.

Fig. III is a detail view in transverse section, taken on the line III—III of Fig. II.

Fig. IV is a view similar to Fig. III, taken on the line IV—IV of Fig. II.

Fig. V is a view in side elevation of one of the cup-shaped members.

Fig. VI is a view in end elevation of the same member.

Fig. VII is a central, longitudinal section through another form of muffler embodying the principles of my invention, the central part of the muffler being broken away.

Fig. VIII is a detail view in transverse section taken on the line VIII—VIII of Fig. VII.

Fig. IX is a view similar to Fig. VIII, taken on the line IX—IX of Fig. VII.

Fig. X is a view in end elevation of one of the cup-shaped members shown in Fig. VII, and Fig. XI is a view in central longitudinal section through the cup-shaped member shown in Fig. X.

Similar reference numerals refer to similar parts throughout the several views and the sectional views are taken looking in the direction of the arrows at the ends of the section lines.

In the normal operation of internal combustion engines the explosions of the fuel charges occur in sequence in each cylinder, and successively in the various cylinders of the engine with the result that the waste gases are exhausted or delivered into the exhaust connections, in a highly heated and expanded condition, in a series of successive impulses or pulsations, which cause highly objectionable noises and require the provision of muffling devices to silence them. Various forms of mufflers have been proposed and are in use, but, so far as I am aware, in the mufflers heretofore most commonly employed, the effort has been to obstruct or deflect the exhaust flow of the gases from the engine by means of baffles or deflecting members, causing the exhaust gases to travel through a more or less tortuous passage, with the object of breaking up the pulsations or impulses of the gases. The practical objection to mufflers of this type is that they create a back pressure which is a decided detriment.

It is among the special purposes of my present invention to provide a structure of muffler, which is exceedingly simple, economical to make and efficient in operation and wherein the objections above noted are avoided.

In carrying out my invention I provide a muffler having a free and practically unobstructed passage for the flow of the exhaust gases from the engine, and a plurality of chambers or pockets freely communicating, in the direction of flow of the exhaust gases, with the unobstructed passage, whereby the flow of the exhaust gases past such communications produces an aspirating or siphonic effect to create more or less of a vacuum in each chamber, thereby exerting a retarding action on the exhaust flow of the gases, and breaking up the pulsations or impulses of such exhaust gas flow, and rendering such flow more uniform.

I also provide means for efficiently dissipating and radiating the heat of the exhaust gases during their flow, thereby substantially contracting or reducing the volume of the gases, and aiding in breaking up the pulsations therein, and I utilize the retarding action exerted upon the flow of the gases to assist and aid in the dissipation and radiation of the heat thereof.

I have found in practice that the series of chambers or pockets, in each of which more or less of a vacuum is created by the flow of the exhaust gases, may be arranged and disposed in various relations with respect to the unobstructed passage traversed by such gases. For example, these pockets or chambers may be successively arranged so as to encircle the passage, as shown in Figs. I to VI, or the exhaust passage may encircle the series of pockets or chambers, as shown in Figs. VII to XI.

I have also found it desirable, in practice, to compensate for the reduction in the volume and speed of flow of the gases resulting from the cooling and retarding action exerted thereon, and this compensation I accomplish by gradually reducing the area of the exhaust passage from its intake towards its delivery end. This reduction in exhaust passage area towards the delivery end of the exhaust passage may be effected in various ways. For example, where the series of vacuum chambers or pockets are disposed to surround the exhaust passage I may employ a core member which is mounted to extend axially through the exhaust passage and which is exteriorly tapered from end to end, the larger end being directed toward the discharge end of the muffler. Where the vacuum pockets or chambers are surrounded by the exhaust gas passage, I taper the muffler casing from the intake towards the delivery end of the passage, the smaller end being towards the delivery end.

To secure economy of manufacture as well as ease and expedition in assembling the muffler of my invention, I prefer to form the same, or the vacuum pockets or chambers thereof, by successively nesting, one within another, a series of members of the required shapes and sizes, said members being so disposed with relation to each other as to effect the communications between the vacuum chambers or pockets and the exhaust gas passage.

In the structure shown in Figs. I to VI, as one embodiment of my invention, I employ a collar, 10, at the delivery or discharge end of the device, which collar, in the particular form shown is provided with a cylindrical sleeve, 11, for attachment to the discharge pipe. This collar, 10, forms a convenient means for supporting the muffler from the chassis of the motor vehicle. A collar, 12, which is slightly conical in form, may be attached to the collar, 10, through the flange, 13, or otherwise, in any convenient manner as, for example, by means of rivets, 14. This forms a stiffening and supporting means for the delivery end of the muffler.

In this embodiment of my invention, the muffler casing and the vacuum chambers are formed by a series of cup-shaped members which are nested one within the other and secured together. Each of these cup-shaped members has a body portion, 15, which is of frustro-conical form having, however, a very slight taper so that it is nearly cylindrical. From the large end of this body portion, 15, the flange, 16, extends radially. This flange constitutes a cooling flange or fin and may be crimped or corrugated so as to give it more radiating surface. From the small end of the frustro-conical portion, 15, there extends the frustro-conical portion, 17, having considerable taper, as shown in Fig. II. From the small end of the frustro-conical portion, 17, there extends the frustro-conical portion, 18, which has a very slight taper and is substantially parallel with the body portion, 15, of the cup-shaped member.

A number of these members are nested or inserted one within the other, as shown in Fig. II, and it will be noticed that the inner surface of the larger end of the body portion, 15, engages the outer surface of the smaller end of the body portion, 15, of the member which is nested in it. In this position, the smaller end of the cup shaped member is spaced a slight distance from the larger end of the frustro-conical portion, 18, so as to form an annular opening, 18ª, at this point, which connects with the annular chamber formed by the frustro-conical portions, 17, of adjacent members, and the frustro-conical portion, 18. These cup-shaped members are all of the same size and shape and are nested one within each other, as shown in Fig. II. The cup-shaped member at the delivery end of the muffler is supported in the collar, 12, as shown, and the parts of the portions, 15, of the cup-shaped members, which engage each other, may be secured together, for instance, by spot-welding. The cup-shaped member at the intake of the muffler has a plain flange, 19, instead of a crimped flange, 16, and this flange may be riveted to the front collar, 20. This front collar may have a cylindrical sleeve, 21, to be connected to the exhaust pipe from the engine.

The structure, which I have thus far described, provides a casing having a plurality of radially extending flanges and a central unobstructed exhaust passage, 21ª, with a plurality of annular chambers surrounding the exhaust passage, 21ª, and connected with it by the annular openings, 18ª. In order to reduce the area of the exhaust passage, 21ª, and cause the gas to flow through that portion of it adjacent the annular chambers, I may provide a central core which is supported axially of the exhaust passage. In the construction which I have shown, the gases are cooled and contracted and, in order that the area of the exhaust passage may be decreased as the gases are cooled, I provide a core which is of larger diameter at the rear or discharge end of the muffler than at the front or intake end. Referring to Fig. II, I have shown a central core, 22, which, in this case, is shown hollow in order to reduce the weight, and which may well be made of sheet metal rolled to the form shown so as to form a hollow tube. This core, 22, tapers from the front to the rear end as shown in the drawings. A core support, 23, may be provided for carrying the rear end of this core. In this case, the core support, 23, has feet, 24, secured to the conical part, 25, of the rear collar. This core support, 23, may have a laterally extending flange, 26, through which extends a stud, 27, connected to the rear end of the core and on which a nut, 28, is threaded. A similar construction may be provided at the front end of the core. In this case, I have used a front core support, 29, the feet, 30, of which may be secured to the collar, 20, in any convenient manner, as, for example, by the rivets, 31. The stud, 33, extends through the flange, 32, of the front core support and the nut, 34, threaded thereon, clamps the two together.

In Figs. VII to XI, I have illustrated another structure, which, although it differs in many of its details, embodies the same broad invention as the structure which I have just described. In this construction, the front and rear members, 35 and 37, which are provided with the attachment sleeves, 36 and 38, engage and support the front and rear ends of the muffler casing, 39. In this construction I prefer to taper the casing, 39, from front to rear, as shown in Fig. VII. A series of cup-shaped members are supported axially of the casing and are nested one within the other so as to form a series of chambers which are surrounded by the exhaust passage but which communicate therewith by substantially annular openings. These cup-shaped members, 48, have slightly conical or flaring side walls in which the grooves or ribs, 49, are pressed inwardly. A central opening, 50, is formed in the bottom of each cup-shaped member. A rod, 43, is threaded at its ends and carried by the supports, 40 and 42, connected to the end members, 35 and 37. The threaded rod may be fastened detachably to these supports in any suitable manner, as by means of the clamp nuts, 44, 45, 46 and 47. The various cup-shaped members, 48, are mounted on the rod, 43, which passes through the apertures, 50, formed in the bottoms of said members. The members are spaced from each other by the sleeves, 51, mounted on the rod, 43, between the bottoms of the several cup-shaped members. The bottom of each cup-shaped member also engages the pressed-in ribs, 49, of the next member, as shown in Fig. VII, so that the members when nested together and spaced as I have described, and as shown in the drawings, form a series of chambers which communicate with the exhaust passage by substantially annular openings, 52.

It will be observed that both of the constructions described and illustrated in this specification operate on the same principle. There is an unobstructed exhaust passage through the muffler to be traversed by the exhaust gases, and there are a series of chambers communicating with the exhaust passage by annular openings so arranged that the flow of exhaust gases, passing through the exhaust passage, acts to create a partial vacuum in these chambers, which partial vacuum acts to retard the flow of the gases and thus break up the pulsations. At the same time, the gases may be cooled and contracted due to the radiation of heat. In the construction illustrated in Figs. I to VI, inclusive, the exhaust gases enter through the collar, 20, flowing in the direction of the arrow. They pass through the central exhaust passage of the muffler and out through the rear collar, 10. The nesting of the cup-shaped members one within the other, forms a series of annular chambers which surround, and each of which communicates by an annular opening being so disposed that the flow of gases will exert an aspirating or siphonic action on the chambers. The crimped flanges, 16, forming a part of the chamber wall, radiate the heat from the exhaust gases and help to cool them. This is a desirable feature but it may be omitted without departing from the broad scope of my invention. Due to the cooling action, the volume and speed of the gas will be less at the discharge end of the muffler than at the intake end, and, in order to make the exhaust passage decrease in cross-sectional area, in proportion to the decrease in volume and speed caused by the contraction of the gases, I employ the tapered core, 22, mounted axially of the muffler. This core also serves to direct the flow of gases past the openings from the annular chambers into the exhaust passage. In the construction illustrated in Fig. VII, the same principles are employed except that there are no cooling flanges. The nested cup-shaped members form a series of annular chambers, and are of substantially uniform diameter throughout the length of the muffler, and the muffler casing or wall decreases in internal diameter towards the discharge end of the muffler in order to compensate for contraction of the gases. The cup-shaped members are so spaced from each other as to provide a substantially annular opening between the bottom of one and the top edge of the next, which communicates with or opens into the exhaust passage of the muffler. In this embodiment of my invention, as in the one which I have previously described, the flow of gases through the exhaust passage has an aspirating or siphonic action on the vacuum chambers, which creates a partial vacuum in them and thus retards the flow of gas through the exhaust passage and breaks up the pulsations.

I am aware that the particular embodiments of my invention, which I have shown and described here, are susceptible of considerable variation without departing from the spirit of my invention, and, therefore, I claim the same broadly, as well as specifically, as indicated by the appended claims.

Having thus described my invention, what I claim as new and desire to secure by Letters Patent, is:

1. A muffler comprising an attachment end and an outlet end for fluid passage, a plurality of members nested one within the other to form chambers having aspirating communication through closely constricted openings in positions where radial lines taken from the axis of said chambers intersect the path of the gases from the openings but do not intersect the openings, said chambers being closed except for such aspirating communication.

2. A muffler comprising a plurality of members nested one within the other to form an exhaust passage and overlapping to form a casing wall and to form within the casing chambers having aspirating communication with the passage, said chambers being otherwise closed.

3. A muffler comprising an exhaust passage having aspirating communication with chambers otherwise closed and in thermal contact with exterior corrugated flanges.

4. A muffler comprising a plurality of members nested one within the other and forming a plurality of annular chambers and an exhaust passage having an attachment end and an outlet end, said passage being in aspirating communication with said chambers through closely constricted openings, all of said openings being intersected by lines taken from the axis of said passage which from the outlet end of the passage form obtuse angles less than 180° with said axis, but not intersected by corresponding lines from the inlet end of said passage.

5. A muffler for gas engines comprising a casing having an exhaust passage therethrough, a plurality of annular chambers surrounding said exhaust passage, a plurality of restricted openings connecting said chambers and the exhaust passage, and a core mounted axially in said exhaust passage.

6. A muffler for gas engines comprising a casing having an exhaust passage therethrough, a plurality of annular chambers surrounding said exhaust passage, a plurality of restricted openings connecting said chambers and the exhaust passage, and a core mounted axially of said exhaust passage and increasing gradually in diameter from the intake to the discharge end of said passage.

7. A muffler comprising a plurality of members nested one within the other to form a casing containing an exhaust passage and to form within the casing inclined angular chambers of relatively large volume having closely constricted annular openings, said openings having aspirating communication between the exhaust passage and these chambers.

8. A muffler comprising a plurality of members nested one within the other, forming a wall of a passage, and each member having portions spaced from the next member to form chambers with deflected peripheral portions adjoining the passage and with aspirating communication with the passage through closely constricted openings.

9. A muffler for gas engines comprising a plurality of cup-shaped members nested one within the other to form a plurality of annular vacuum chambers and a central exhaust passage connected with said vacuum chambers by aspirating openings, each of said members having an external, radiating flange.

10. A muffler for gas engines comprising a plurality of cup-shaped members nested one within the other to form a plurality of annular vacuum chambers and a central exhaust passage connected with said vacuum chambers by aspirating openings, each of said members having an external, annular, radiating flange which is crimped to increase its radiating surface.

11. A muffler for gas engines comprising a muffler casing made up of a plurality of cup-shaped members nested one within the other to form a plurality of annular chambers and a central exhaust passage connected with said chambers by a plurality of aspirating openings, collars mounted on the front and rear ends of said casing, and a core supported by said collars axially of the exhaust passage.

12. A muffler for gas engines comprising a muffler casing made up of a plurality of cup-shaped members nested one within the other to form a plurality of annular chambers and a central exhaust passage connected with said chambers by a plurality of aspirating openings, collars mounted on the front and rear ends of said casing, and a hollow metal core supported by said collars axially of the exhaust passage.

13. A muffler for gas engines comprising a muffler casing made up of a plurality of cup-shaped members nested one within the other to form a plurality of annular chambers and a central exhaust passage connected with said chambers by a plurality of aspirating openings, collars mounted on the front and rear ends of said casing, and a hollow metal core supported by said collars axially of the exhaust passage and increasing in diameter as it approaches the discharge end of the muffler.

14. A muffler for gas engines comprising a plurality of members nested one within the other, each member comprising two frustro-conical portions of different diameter and a very slight taper, connected by an intermediate frustro-conical portion of more pronounced taper, said members being so nested that the small end of the frustro-conical portion of small diameter of one member is spaced but slightly from the large end of the corresponding frustro-conical portion of the member in which it is nested to provide a closely constricted annular aperture having aspirating communication with an annular chamber formed by the nested members.

15. A muffler for gas engines comprising a plurality of cup-shaped members nested one within the other, each cup-shaped member comprising two frustro-conical portions of different diameter and very slight taper, connected by an intermediate frustro-conical portion of more pronounced taper, and an annular flange extending radially from the large end of the frustro-conical portion of large diameter, said members being nested so that the small end of the frustro-conical portion of small diameter of one member is spaced from the large end of the corresponding frustro-conical portion of the member in which it is nested to provide an annular opening communicating with an annular chamber formed by the nested members.

16. In a muffler a casing having therethrough a longitudinal passage of decreasing volume, and a succession of separate chambers disposed along said passage, each having aspirating communication thereinto through closely constricted openings, all of said openings being free from intersection of radial lines taken from the axis of said passage but being intersected by lines which from the passage end of smaller volume form obtuse angles less than 180° with said axis.

17. A muffler for internal combustion engines comprising a series of annular angular members each provided with an external heat-radiating flange integral with said member and longitudinally nested together to form an elongated main body closed except for inlet and outlet openings.

18. The method of muffling exhaust gases which consists in projecting the exhaust gases along an extended path while at the same time compensating for the decrease in volume and velocity caused by the contraction of the gases, and utilizing the velocity of projection along said path to create retarding vacuums extending in series from one end of the path to the other.

19. A muffler for gas engines comprising a casing provided with an exhaust passage therethrough, a plurality of chambers having a corresponding number of aspirating openings communicating with said exhaust passage whereby the flow of gas through said exhaust passage tends to create a partial vacuum in said chambers and means for compensating for the decrease in volume and velocity caused by contraction of said gases, the only openings from said chambers being the aspirating openings between the chambers and the exhaust passage.

20. A muffler comprising a series of similar frustrum-shaped members nested one into the other to form chambers and the wall of a passage for fluid travel, the wall providing a closely constricted aspirating opening between each chamber and the passage and presenting a substantially continuous surface of travel for fluid.

21. A muffler for gas engines comprising a plurality of nozzle-forming members nested together about a common exhaust passage in such manner that the nozzles commonly communicate with said passage, and having vacuum chambers communicating with said nozzles, and means to maintain practically constant fluid velocity through the passage.

22. As an article of manufacture, a chamber forming member, longitudinally of conical cross section, and all of whose walls are conical, the fore part of which is adapted to coact with the rear part of a similar member to form between the adjacent walls a nozzle, and a communicating vacuum chamber the elements of whose sides are straight lines.

23. As an article of manufacture, a chamber-forming member longitudinally of conical cross section, the fore part of which is adapted to coact with the rear part of a similar member to form between the adjacent walls a nozzle and a communicating chamber, together with a flange at the base of the conical section for radiating the heat from the muffler.

24. A muffler comprising a plurality of members nested one within the other to form external radiation flanges of substantial area, a casing and chambers having contracted orifices, the inner walls of said nested members forming an exhaust passage, and said orifices providing aspirating communication between said chambers and passage.

In testimony whereof, I affix my signature.

JOSEPH LEDWINKA.